(12) United States Patent
Ederer (10) Patent No.: US 7,736,578 B2
(45) Date of Patent: Jun. 15, 2010

(54) METHOD FOR THE CONSTRUCTION OF A LAMINATED COMPOUND

(76) Inventor: Ingo Ederer, Holzbauerstrasse 4, Riederau D-86911 (DE)

( * ) Notice: Subject to any disclaimer, the term of this patent is extended or adjusted under 35 U.S.C. 154(b) by 196 days.

(21) Appl. No.: 11/767,778

(22) Filed: Jun. 25, 2007

(65) Prior Publication Data

US 2008/0001331 A1 Jan. 3, 2008

(30) Foreign Application Priority Data

Jun. 30, 2006 (DE) .................. 10 2006 030 350

(51) Int. Cl.
*B29C 35/08* (2006.01)
(52) U.S. Cl. .................. 264/405; 264/113; 264/308
(58) Field of Classification Search .................. 264/497, 264/113, 308, 405
See application file for complete search history.

(56) References Cited

U.S. PATENT DOCUMENTS

| | | | |
|---|---|---|---|
| 4,247,508 A | 1/1981 | Housholder |
| 4,369,025 A | 1/1983 | Von Der Weid |
| 4,575,330 A | 3/1986 | Hull |
| 4,665,492 A | 5/1987 | Masters |
| 4,752,352 A | 6/1988 | Feygin |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |

(Continued)

FOREIGN PATENT DOCUMENTS

AU 720255 B2 5/2000

(Continued)

OTHER PUBLICATIONS

Cima et al., "Computer-derived Microstructures by 3D Printing: Bio-and Structural Materials," SFF Symposium, Austin, TX, 1994.

(Continued)

*Primary Examiner*—Joseph S Del Sole
*Assistant Examiner*—James Sanders
(74) *Attorney, Agent, or Firm*—Dobrusin & Thennisch PC (57) ABSTRACT

A method or procedure for the construction of a laminated compound or mould made up of a number of layers of particle material on top of each other, which are hardened and joined to each other in predetermined onsite areas, which can differ from each other depending on position and expansion, so that from the predetermined hardened areas of the laminated compound at least one mould is formed. The layers are deposited individually one after another in predetermined layer thickness by the dispensing of particle material from a dispensing device during its movement above a working field and according to computer data in predetermined areas.

19 Claims, 6 Drawing Sheets

U.S. PATENT DOCUMENTS

| | | | |
|---|---|---|---|
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,837,960 A * | 11/1998 | Lewis et al. | 219/121.63 |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 | 5/2004 | Abe et al. | |
| 6,838,035 B1 | 1/2005 | Ederer et al. | |
| 7,004,222 B2 | 2/2006 | Ederer et al. | |
| 7,137,431 B2 | 11/2006 | Ederer et al. | |
| 2001/0050031 A1 | 12/2001 | Bredt et al. | |
| 2002/0026982 A1 | 3/2002 | Bredt et al. | |
| 2002/0111707 A1 | 8/2002 | Li et al. | |
| 2003/0083771 A1 | 5/2003 | Schmidt | |
| 2004/0012112 A1 | 1/2004 | Davidson et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2005/0017394 A1 | 1/2005 | Hochsmann et al. | |
| 2005/0167872 A1 | 8/2005 | Tsubaki et al. | |

FOREIGN PATENT DOCUMENTS

| | | |
|---|---|---|
| DE | 4300478 | 8/1994 |
| DE | 4400523 | 7/1995 |
| DE | 4440397 | 9/1995 |
| DE | 19511772 A1 | 10/1996 |
| DE | 19723892 C1 | 9/1998 |
| DE | 19846478 C2 | 4/2000 |
| DE | 19853834 | 5/2000 |
| DE | 10047614 | 4/2002 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005/113219 A1 | 12/2005 |

OTHER PUBLICATIONS

EOS Operating Manual for Laser Sintering Machine with Brief Summary.

Sachs et al., "Three-Dimensional Printing: Rapid Tooling and Prototypes Directly from a CAD Model", Massachusetts Institute of Technology, pp. 131-136.

Sachs et al., "Three-Dimensional Printing: Rapid Tooling and Prototypes Directly from a CAD Model", Massachusetts Institute of Technology, pp. 143-151.

Jacobs et al., 2005 SME Technical Paper, title "Are QuickCast Patterns Suitable for Limited Production?".

Feature Article—Rapid Tooling—Cast Resin and Sprayed Metal Tooling by Joel Segal.

Williams, "Feasibility Study of Investment Casting Pattern Design by Means of Three Dimensional Printing", Department of Machanical Enginerring, pp. 2-15.

Copending National Phase Application, WO 02/26419, Apr. 4, 2002.
Copending National Phase Application, WO 02/26420, Apr. 4, 2002.
Copending Patent Application, U.S. Appl. No. 11/320,050 (corresponds with PCT WO 02/26420), (U.S. Appl. No. 7,137,431),Dec. 28, 2005.
Copending National Phase Application, WO 03/103932, Dec. 18, 2003.

Copending National Phase Application, WO 2004/112988, Dec. 8, 2005.
Copending National Phase Application, WO 2005/113219, Dec. 1, 2005.
Copending U.S. Appl. No. 10/866,205, (Published as 2005/0017394), Jun. 11, 2004.
International Search Report, WO 2004/110719, Jan. 11, 2005.
International Search Report, WO 2005-113219, Dec. 1, 2005.
Gephart, Rapid Prototyping, pp. 118-119.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE00/03324, (Published as W002/26419), Jun. 5, 2001.
International Search Report, PCT/DE01/03661, (Published as W002/26420), Feb. 28, 2002.
International Search Report, PCT/DE01/03662, (Published as WO02/26478), Mar. 1, 2002.
Marcus, et al., Solid Freeform Fabrication Proceedings, Sep. 1995, p. 130-33.
US 4,937,420, 06/1990, Deckard (withdrawn)

* cited by examiner

METHOD FOR THE CONSTRUCTION OF A LAMINATED COMPOUND

CLAIM OF PRIORITY

This application claims the benefit of the filing date German Patent Application 102006030350.4, filed on Jun. 30, 2006, hereby incorporated by reference for all purposes.

FIELD OF THE INVENTION

The invention concerns a method or procedure for the construction of a laminated compound made up of a number of layers of particle material on top of each other, which are hardened and joined to each other in predetermined onsite areas to manufacture a mould.

BACKGROUND

Objects can be created in a limited space with the assistance of generative methods according to computer data. For example, particle material can be deposited layer by layer through laser sintering on a building platform determined by the working field, and then by means of selectively applied laser radiation selectively hardened. The building platform is subsequently lowered and the procedure of applying another layer of particle material and subsequent hardening is repeated until the mould has been formed to its full dimensions.

In other methods the hardening of the particle material is achieved by the selective application of a binding agent to the layers of particle material.

In order to prevent the loose particle material of both described methods from flowing uncontrollably over the edges of the working field, in each case the building platform is enclosed within a container. The maximum size of the components can therefore only be that of the container. Bigger components must be put together from several parts, at the risk of a loss of precision. With the production of components that are significantly smaller than the container, the whole cross section surface of the container must be filled with particle material, so that the support effect of the particle material stays intact for the incomplete laminated compound. As a rule this results in a greater utilization of excess material relative to the size of the component as in the case of bigger components.

For example, it is known from EP 0 644 809 B1 how to construct a ceramic casting mould with several casting cavities in a shallow container, which encloses a rectangular working field. For a linear depositing of the particle material on the floor of the container, and the following layers, a longitudinal dispensing device is envisaged. Together with an elongated print head with a row of selectively operated print nozzles for the binding agent, the dispensing device is moved above the container on tracks running on both sides of the container. However, in this process the distance between the dispensing device and the print head on the one hand and the top of the already built-up part of the laminated compound in the container on the other hand, is reduced by the thickness of the new layer at the depositing of every new layer. This results in different surface coating conditions for the different layers of the laminated compound.

According to another design example, from EP 0 644 809 B1, a construction container with a building platform as container floor, which is lowered by the thickness of the layer before the depositing of each layer, is envisaged. Generally, the container is lowered into a work opening of a workbench in such a way that the top of the container is aligned with the workbench. The thickness of each layer is determined by the cavity between the top of the container and the previous layer resulting from the lowering of the container. The particle material is poured into the cavity by a surface coating unit that can be moved above the workbench, and it is smoothed along the top of the workbench by a cylinder and/or a scraper. Excess particle material is pushed away onto the workbench and disposed of.

The provision of a construction container, which contains a building platform that can be lowered in a vertical direction, requires a large measure of technical complexity in the sealing of the container wall against the building platform, to prevent the uncontrolled flow-out of particle material through the gap between the edge of the building platform and the container wall, without running the risk that the platform gets jammed against the container wall due to the granular particle material.

A further disadvantage of the currently specified construction forms, with building platforms that can be lowered, lies in the continuous increase of the weight that has to be moved around on the building platform as the building process proceeds. In applying the new layer, in particular, it can be necessary that the powder bed be lowered by slightly more than the actual thickness of the layer and then be lifted again to the required measurement to be able to set the thickness of the layer accurately enough. With this revolving operation not only the total weight of the powder fill including the building platform but also the friction force of the powder bed against the container wall and the friction of the seal between the building platform and the container wall must be overcome. This leads to extreme pressure on the tracks and power unit.

According to another design example, from EP 0 644 809 B1, one container wall is discarded and instead an artificial container wall is thereby constructed in the work opening of the workbench around the laminated compound, so that the particle material of every newly deposited layer that is supported by the edge of the work opening is also hardened along the perimeter edge of the newly deposited layer. With such a design form the sealing problematic between the building platform and the construction container wall is indeed prevented; however, here too the complete available working field must be filled with particle material. Furthermore, a sealing problem develops between the edge of the work opening and the already hardened part of the artificial container wall at the completion of the previous layer, over which the particle material of the newly deposited layer extends.

Concerning this, another design example is known, from EP 0 644 809 B1. With this design form an artificial container wall is constructed. The particle bed is not lowered relative to the workbench in which the work opening is formed, from which edge every newly deposited layer is enclosed. Instead, the workbench with the surface coating unit and the print head for the depositing of the particle material and the binding agent is lifted relative to the particle bed. This design example is considered especially suitable for massive components, for which construction it is easier to lift the workbench with the surface coating and print mechanism instead of lowering the powder bed.

SUMMARY OF THE INVENTION

The invention concerns a method or procedure for the construction of a laminated compound made up of a number of layers of particle material on top of each other, which are hardened and joined to each other in predetermined onsite areas, which can differ from each other depending on position and expansion, so that from the predetermined hardened areas of the laminated compound at least one mould 6 is formed. The layers are deposited individually one after another in predetermined layer thickness by the dispensing of particle material from a dispensing device 2 during its movement above a working field and according to computer data in predetermined areas, i.e. in a predetermined area per layer or in several predetermined areas per layer selectively hardened. Through the selective hardening of the layer the hardened area is also joined to the hardened area of the previous layer, so that in the laminated compound through the hardening of the predetermined areas a continuous layer-to-layer mould 6 or several such continuous moulds begin to form.

It is also seen that the present invention relates to a method or for the construction of a laminated compound 1 made up of a number of layers of particle material on top of each other on a working field, which are hardened and joined to each other in predetermined onsite areas, so that from the hardened areas of the laminated compound 1 at least one mould 6 is formed, whereby the layers are deposited individually one after another in predetermined layer thickness by the dispensing of particle material from a layering unit during its movement above a working field and according to computer data in predetermined areas selectively hardened, and which has an elongated dispensing opening for the particle material which is open at the bottom, which extends horizontally straight and vertical to the direction of movement of the dispensing device, and a layering unit with an elongated dispensing opening for the particle material, which is open at the bottom, is used as dispensing device, and which can be systematically switched on and off for the systematic dispensing of the particle material, whereby the laminated compound 1 on the working field is formed freestanding and without the use of an outer edge enclosure device for the respective top layers to be deposited, that the dispensing device is moved on a frame which can gradually be adjusted vertically upwards by its layer thickness before the depositing of each respective top layer.

It is possible that the dispensing device can be set into motion from a position where its dispensing opening is at a distance in front of the front edge of the previous layer in the direction of movement of the dispensing device, and is switched on when its dispensing opening reaches the area above the front edge of the previous layer. It is also possible that the dispensing device can be moved over the back edge of the previous layer in the direction of the movement, and switched off when its dispensing opening reaches the area above the back edge of the previous layer.

The top layer can be smoothed and/or compressed behind the dispensing opening during the movement of the dispensing device in the direction of movement. Any compression can be performed in a compression movement by movement components corresponding to the direction of movement of the dispensing device.

A dispensing device may be used, which has a funnel-shaped dispensing duct for the particle material to be deposited, which ends at its bottom end in the dispensing opening, which can be switched on by the fact that the particle material vibrates in the dispensing duct and thereby becomes fluid.

The layers may be deposited in a layer thickness of about 100 to 500 µm at a granular size of the particle material of about 20 to 300 µm. More preferably whereby the layers are deposited in a layer thickness of about 100 to 500 µm at a granular size of the particle material of about 50 to 200 µm.

The deposited top layer can be hardened along the edge area of at least the front edge in the direction of movement of the dispensing device by the administering of a laser beam or by the application of a binding agent, so that a hardened boxing of the laminated compound 1 is formed from the particle material, at least along its front end in the direction of movement of the dispensing device. The edge area of the top layer may be hardened, at least along its front edge compared to the hardened edge area of the previous layer, offset to the vertical centre of the laminated compound 1, so that the boxing wall runs at an angle to the vertical.

The dispensing device may be switched on when the dispensing opening is above the area close to the back of the front edge of the previous layer in the direction of movement of the dispensing device. The dispensing device may be switched off when the dispensing opening is above the area close to the front of the back edge of the previous layer in the direction of movement of the dispensing device.

The lifting operation for the lifting of the dispensing device and the moving operation of the dispensing device may be controlled independent of one another.

One specific aspect contemplates a method for the construction of a laminated compound 1 made up of a number of layers of particle material on top of each other on a working field, which are hardened and joined to each other in predetermined onsite areas, so that from the hardened areas of the laminated compound 1 at least one mould 6 is formed, with a framework 5 supported by pillars 4 of a base frame, which can be gradually adjusted in a vertical direction and has an access opening over the working field for a dispensing device 2 for the measured dispensing of the particle material onto the working field, and which can be moved horizontally on the dispensing device, which has an elongated dispensing opening which is open at the bottom, which extends horizontally straight and vertical to the direction of movement of the dispensing device, and which can be systematically switched on and off for the systematic dispensing of the particle material. The base frame may be designed to be mobile and for this purpose can be moved on rollers or wheels.

DETAILED DESCRIPTION OF THE PREFERRED EMBODIMENT

Through the invention the task is resolved to provide a method for the building of a laminated compound from a number of layers from particle material on top of one another, which for the formation of at least one mould 6 in predetermined onsite areas are hardened and joined to one another. With this process it should be possible to manufacture especially big and heavy moulds, with little loss of particle material relative to the size of the component, with flexible possibilities for the adjustment of the size of the working field.

Also with the method according to the invention, the layers are deposited in predetermined layer thickness one after the other on top of each other, through the depositing of the particle material from a dispensing device 2 during its movement above the working field, and selectively hardened in predetermined areas according to computer data. Contrary to the current state of technology, in the method according to the invention, the laminated compound is constructed freestanding on the working field and without the use of an outside edge boxing mechanism for the enclosure and support of the top layer to be deposited each time. This means that the building, site in adjusting to different sizes of the mould 6 or moulds to be constructed, can be variable, because the size of the working field is not dependent on the size of the cross section of the container or of one of the work openings, determined by the size of the working field, for the edge support of the respective top particle layer.

For the depositing of the top layer on the previous layer a dispensing device 2 is used as surface coating unit according to the invention, which is lifted by its layer thickness before the depositing of the top layer, and which contains a longitudinal dispensing opening, that opens downward, for the particle material and which extends horizontally straight and vertically to the direction of movement of the dispensing device 2. The dispensing device 2 for the systematic dispensing of the particle material, which can also take place dependent on the speed of operation of the dispensing device 2 above the working field, can be systematically switched on and off.

Therefore, as with the above-mentioned design example from the EP 0 644 809 B1, according to the invention, the building platform is not lowered by the layer thickness, but instead the surface coating unit is lifted. With that it is not necessary to provide a building platform, which must be lowered together with the increasing weight of the expanding laminated compound and in its height be adjusted precisely to the layer thickness. Different from the design example from EP 0 644 809 B1 that is based on the lifting of the surface coating unit, according to the invention a dispensing device 2 is used as surface coating unit, which can be systematically switched on and off in order to facilitate the systematic dispensing of a predetermined, preferably constant, linear flow rate of particle material per unit length of the dispensing device 2 and per time unit. Thereby a systematic adjustment to different size working fields can be achieved. The layer thickness of the newly to be desposited top layer, according to the invention, is determined in the process by the flow rate of the particle material per unit length of the dispensing device 2 and per time unit, dependent on the speed of operation of the dispensing device 2.

On the other hand the dispensing device 2 should be lifted by the layer thickness of the top layer before the depositing of the respective top layer and after the completion of the respective previous layer, that means to be lifted by that amount, which results from the layer thickness to which the deposited flow rate of the dispensing device 2 per unit length of the dispensing device 2 and per time unit, dependent on the speed of operation of the dispensing device 2, is adjusted. This can be achieved by the fact that the lifting operation for the lifting of the dispensing device 2, which is preferably a stepper motor with at least a thread spindle with a recirculating ball unit, and the moving operation of the dispensing device 2 can be controlled independent of one another. In this way it is also possible to vary the layer thickness of the laminated compound from layer to layer.

In the preferred design of the system according to the invention, the dispensing device 2 is brought into motion from a position in which its dispensing opening is positioned in front of the front edge of the previous layer in the direction of movement of the dispensing unit, and is switched on when the dispensing opening reaches the area above the front edge of the previous layer. Through this the acceleration stage of the dispensing unit from its stationary position up to the desired speed of operation, as well as the initial speed of the flow rate that starts from the dispensing device 2 after the switching on of the dispensing device 2, up to reaching the desired flow rate per time unit, can be adjusted in such a way that the speed of operation and the flow rate in the area of the front edge of the previous layer facing the dispensing device 2 at its start have the desired values. If in the process a small amount of particle material is dispensed before reaching the front edge of the previous layer, then this spillage can fall down in front of the already built up section of the laminated compound, so that a small slope-like fill can be formed little by little in front of this part of the laminated compound.

Accordingly, it is furthermore preferred that the dispensing device 2 is moved over the back edge in the direction of the movement of the dispensing device 2 of the previous layer and switched off when its dispensing opening reaches the area above the back edge of the previous layer. In this process, too, dispensed particle material can fall down behind the back edge of the already built up part of the laminated compound, so that a small slope-like fill can be formed little by little behind this part of the laminated compound.

Preferably, each top layer is smoothed and/or compressed during the movement of the dispensing device 2 behind its dispensing opening, whereby the compression movement is preferably done with a movement component that corresponds with the direction of movement of the dispensing device 2.

Sand or a powder with a grit size of 20 to 300 μm is preferred as particle material, from 50 to 200 μm is preferably used, whereby the layer thickness measures 100 to 500 μm depending on the grit size.

In the preferred design of the method according to the invention, the deposited top layer is hardened along the edge area of at least the front edge in the direction of movement of the dispensing device 2, preferably also along the edge area of the back edge, by the administering of a laser beam or by the application of a binding agent, so that a hardened boxing of the laminated compound is formed from the particle material, at least along its front end in the direction of movement of the dispensing device 2, preferably also along the back end. Preferably, the sidewalls, which run parallel to the direction of movement of the dispensing device 2, are also hardened in this way.

Such a hardening of at least the edge areas of the laminated compound especially allows for the forming of such moulds, which have rectangular outside walls and which take up the whole working field. But it is also possible, through the hardening of the edge areas, to construct artificial walls from the particle material, from which a container is formed, to form smaller moulds of selected sizes and shapes in its inner cavity.

With the invention it is also possible for the edge area of the top layer to be hardened, at least along its front edge compared to the hardened edge area of the previous layer, offset to the vertical centre of the laminated compound, so that the boxing wall runs at an angle to the vertical.

In a further design of the invention the dispensing device 2 can be switched on when the dispensing opening is above the area close to the back of the front edge of the previous layer in the direction of movement of the dispensing device 2, and/or the dispensing device can be switched off when the dispensing opening is above the area close to the front of the back edge of the previous layer in the direction of movement of the dispensing device 2.

Such a design of the invention allows the formation of laminated compounds as well as moulds, whose surface area runs slanted or almost domed, without the use of particle material outside of the slant or the dome.

Accordingly, it is also possible with the method according to the invention, to form laminated compounds as well as moulds in stages, without additional use of powder, by reducing the working field for the top area compared to the working field for the bottom area of the laminated compound.

Because, according to the invention, the building platform does not move towards the dispensing and hardening unit, but both the latter move towards the building platform, which in turn rests on the ground for example, it results in the great advantage that the weight to be moved around over any building level remains constant.

This can for example be achieved in such a way that the dispensing unit and the hardening unit are mounted on a stable framework. The framework itself is for example moved vertically by ball screw spindles fastened vertical to the ground to the four corners or to a base frame at the bottom. For the steering of the unit one or more steering units can be installed on one or more sides. The framework, which ideally, but not limited to that, is closed, has an opening in the middle through which the dispensing unit as well as the hardening unit have access to the working field. The building platform is situated at the bottom and can for example have the form of a palette, with openings for forklift conveyance or eyelets for crane conveyance. In another design form a building platform is completely discarded and the components are manufactured directly on the ground.

The movement can for example be made possible by wheels fitted to the base frame, which roll on tracks for example. The base frame can then alternatingly service two building sites lying next to each other with the respective building platforms. While the plant is busy forming a mould 6 on the one building site, the previous mould 6 can be freed from the remaining sand. Thereby the capacity of the plant increases. During the building process the wheels of the base frame are locked to prevent an unplanned movement of the base frame. The mobility of the plant can also be used to make a later movement of the mould 6 unnecessary. So the plant can be brought to the place where the mould 6 will be used finally and the building process can be started. This, for example, makes the plant ideal for the construction of large casting moulds, which can weigh several tonne and are therefore finished more ideally at the final casting place.

A dispensing device can be used one such as described in DE 102 16 013 A1. In the case of that equipment it concerns a vibration layering unit, at which a pivot-mounted container with an opening in the form of a slit at the bottom side of the preferably funnel shaped dispensing duct is activated into a revolving movement. The switching on of the dispensing device is achieved through the vibration of the particle material in the dispensing duct, resulting in its becoming fluid, so that it flows out of the dispensing slit. In a stationary position the angle of repose is sufficient to prevent the outflow of particle material inside the dispensing duct. The dispensing unit is moved across the building site at a constant speed and so produces a layer of particle material of a defined layer thickness.

Figure 1:
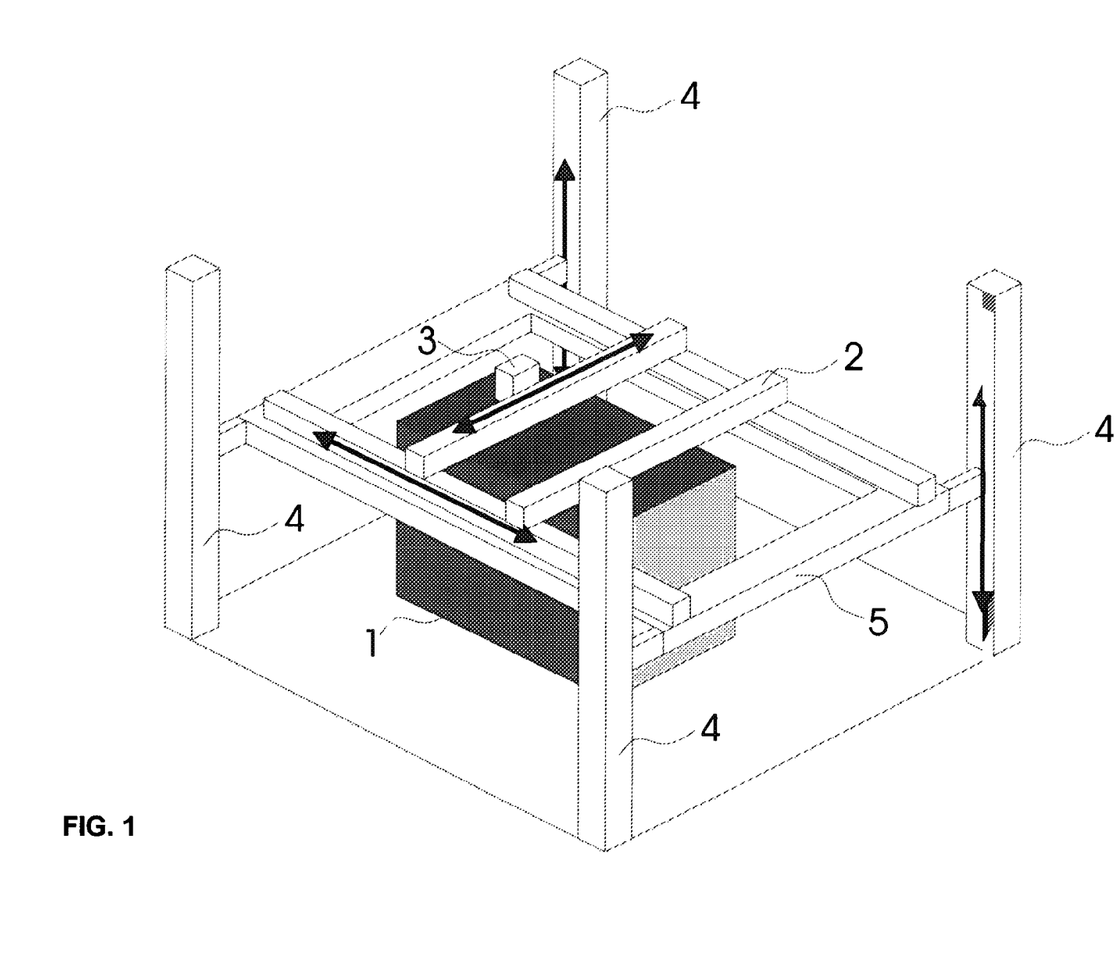
FIG. 1 is a perspective view of an illustrative a design of a device according to the invention.

However, other layering units can also be used, as for example the layering unit in FIG. 1 described in the mentioned EP 0 644 809 B1, if this is designed for a defined dispensing flow rate and can be systematically switched on and off.

Through the systematic switching on of the dispensing device 2 it is achieved that indeed only in those spots where the final mould 6 should be formed, material is deposited. By that particle material as well as building time is saved, because not the whole but only the utilized working field must be coated. In the cross direction of the layering axis the working field can be enclosed by so-called shutters or panels, for example. In addition, exchangeable units can be provided with the layering unit according to the design form described above, which shorten the dispensing slot in its length systematically. This is aimed at a reduction of the width of the surface to be layered. These exchangeable units can for example be in the form of retractable sliders.

Simple mould geometries as for example rectangular mould blocks can be built as they are, due to the vertical walls of the enclosing sides. In the plant several such mould blocks can be produced at the same time, because the components can be placed next to, behind and on top of each other within the available working field.

More complex geometries with undercuts can be built up in a rectangular box with vertical walls or with walls of defined strength sloping slightly to the inside. The box is at least the height of the mould 6 to be built on the inside. This box is manufactured in the building process from hardened particle material, together with the geometry that is contained in it. When needed the box can have a floor. This is for example necessary when the whole box with its contents should be removed after completion and brought to another location. After completion of the building process the box is broken away or lifted off to get to the actual component (the mould) or components.

Here too the possibility exists to position one or more boxes next to, behind or on top of each other. It is preferred at the design of the box that the enclosures on the side form a closed rectangle, as far as possible, from the top view. From the layering unit particle material is at least actively deposited inside this rectangle. Ideally the active area of the layering unit is slightly bigger than the width of the rectangle to be built. The starting point of the layering unit run should lie a bit before the actual geometry to make certain that the layering unit is in a stationary position when it reaches the actual geometry. The excess particle material deposited on the edge falls to the ground and forms a non-detrimental spillage around the object to be built.

After completion of the building process the loose particle material 7 is removed by vacuuming or blowing it off, for example. This can take place inside the plant or the components are taken to another location on the building platform where it is cleaned and reworked if necessary.

During the process, the layering unit (the dispensing device) can be moved on a crossbeam, which rests on parallel tracks, which in turn is fastened to the framework that can be adjusted vertically. The drive mechanism can for example be provided by a belt drive, whereby in this case ideally both tracks are powered to prevent the unit from jamming. Both powered sides can be connected by a drive shaft and be powered by a single motor.

The layering unit can be supplied with particle material by means of a feeder. This can for example take place by means of a pneumatic conveyor, which moves with the layering unit. This sucks the particle material, when needed, through a flexible pipe from a container standing next to the plant. The particle material is distributed in the layering unit via the longitudinal axis either through the formation of an angle of repose or a distribution unit, a powered spiral for example.

The hardening unit can for example be a laser beam systematically deflected and optically focused over the working field via a so-called Galvanometer-mirror. In another design the use of a laser beam through glass fibre is also possible. The glass fiber with attached focusing optics can be steered above the working field by means of its own X-Y guiding unit and in this way induce the selective hardening of the particle material. Instead of the one laser beam or the one glass fiber many such methods can be used to cover large working fields. In another design one or more diode lasers with corresponding focusing optics are steered above the working field.

In a preferred design, a printing head, which deposits single drops of a binding agent from several nozzles systematically on the respective top layers, which leads to a hardening of the particle material, is steered above the working field. The printing head can move above the working field in a meandering fashion.

The steering of the printing head can take place via an X-Y mechanism of powered axles. Ideally, the longitudinal movement of the printing head takes place via belt drive, whereas the short offset route takes place via a spindle drive with a shaft joint due to the increased requirement for precision of positioning before the start of the new longitudinal movement in the opposite direction.

However, another movement mechanism as for example a linear power drive, or other equipment for the moving of printing heads as for example hexapodes are also possible.

The print route of the printing head can be optimised according to the actual geometry to be printed. The speed of the longitudinal movement during the print action results from the acceptable frequency of the individual dispensing actions of the nozzles and the desired solution of the deposited binding agent drops on the particle layer. This speed can be supplemented by an increased positioning speed, which is selected by the control when the printing head is moved to the start of the next print run. The printing head can complete this route via the shortest distance.

EXAMPLES FOUND IN THE ILLUSTRATIONS

FIG. 1 illustrates a design of a device according to the invention from the diagonal view. The Z-axis is made up of four vertical pillars 4, which supports a framework 5, on which the dispensing device 2 and a print head 3 are mounted on the respective motion axles. In the centre there is a laminated compound 1, for example a mould 6 to be seen, which is being built up. With the enlargement of the laminated compound the framework 5 is adjusted vertically step by step.

Figure 2:
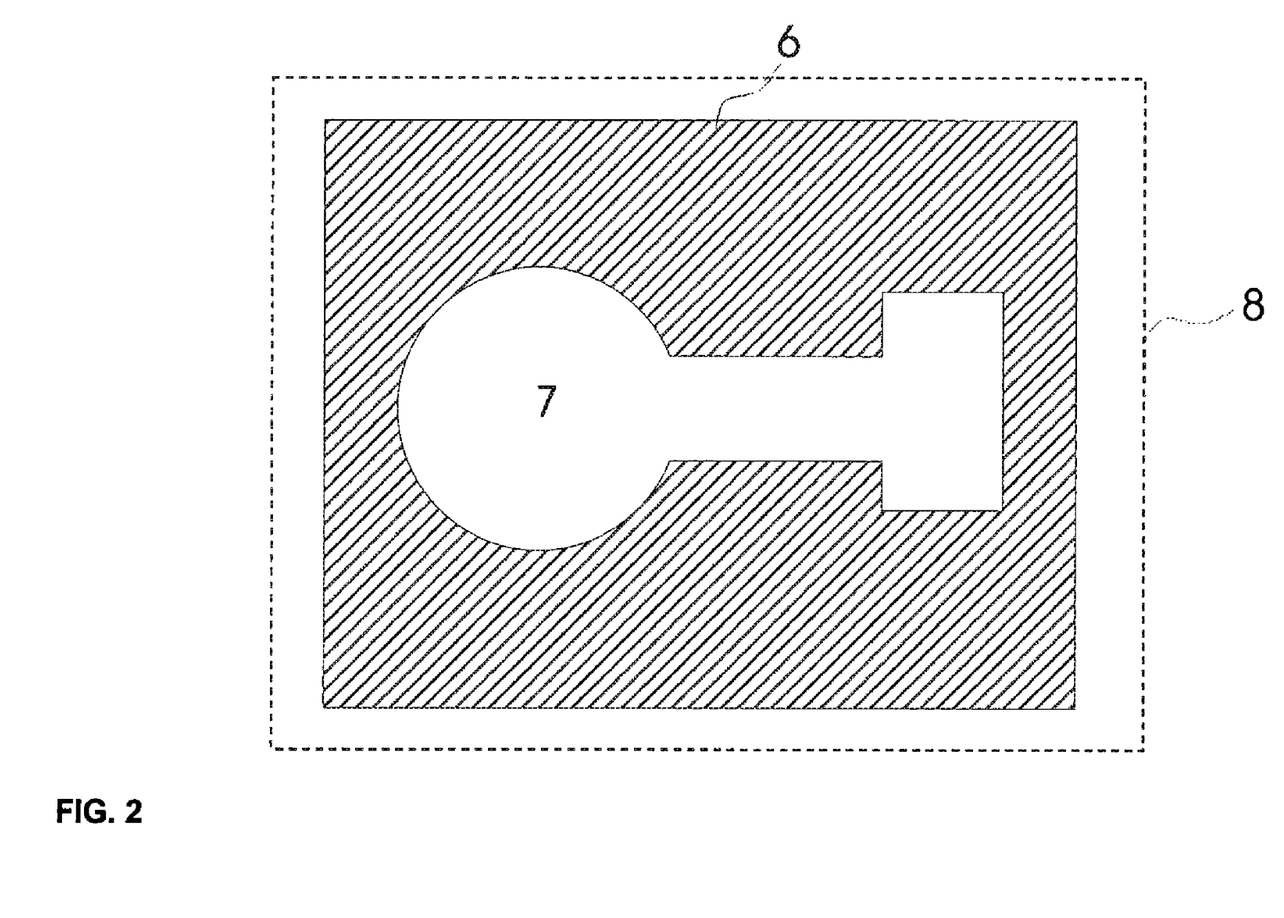
FIG. 2 is a top view of an illustrative example of a mould formed according to the invention.

FIG. 2 illustrates a mould 6 formed from a laminated compound by selective hardening from the top view (without plant) on the working field 8. Clearly recognizable is that because of the enclosure of the mould 6 no additional building box is needed. The inside contour is filled with the loose particle material 7 during the build-up phase. This can for example be vacuumed at the end of the process.

Figure 3:
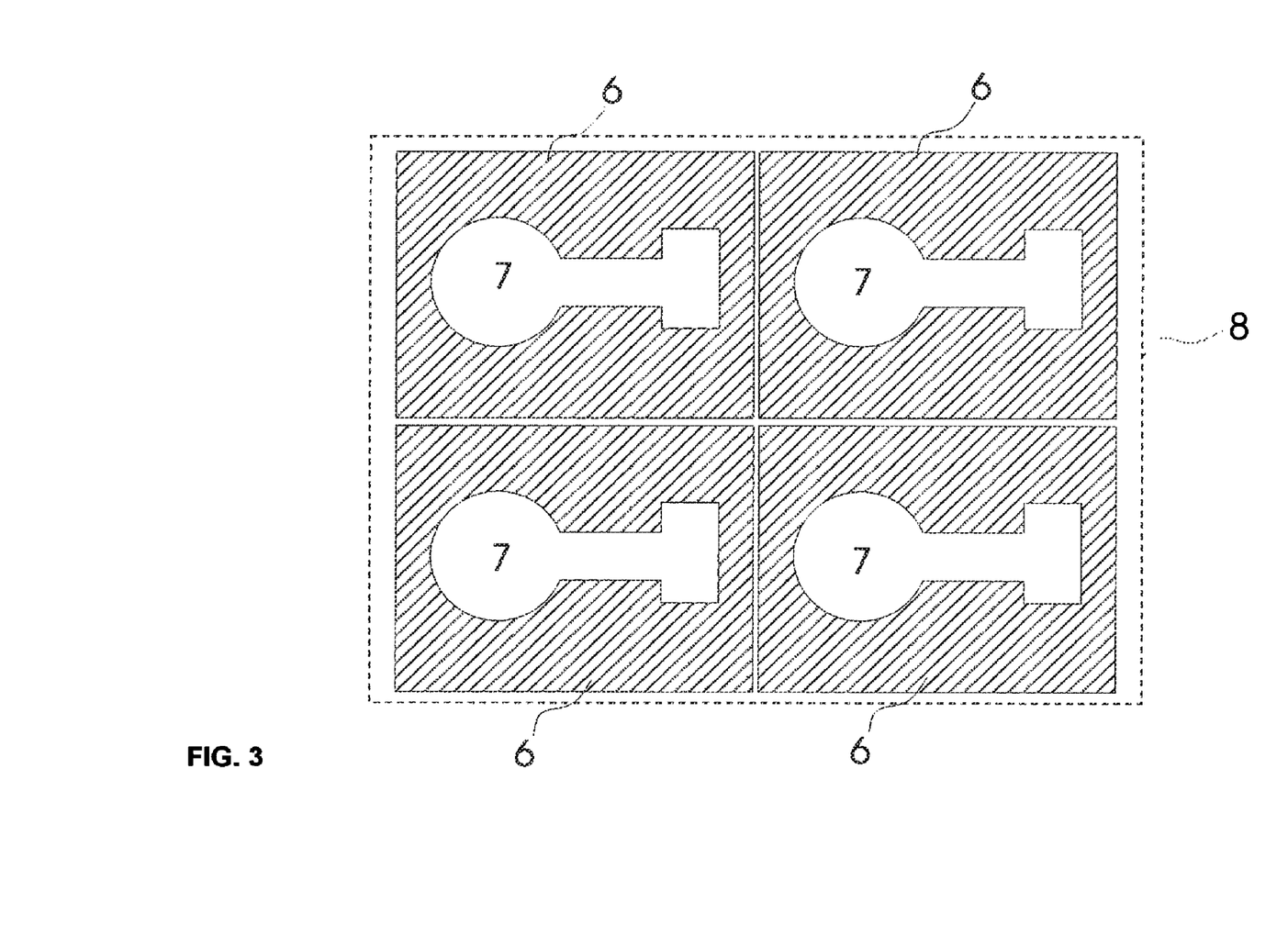
FIG. 3 is a top view of an illustrative example of four moulds formed according to the invention.

FIG. 3 illustrates a total of four moulds 6, which are formed in the plant at the same time.

Figure 4:
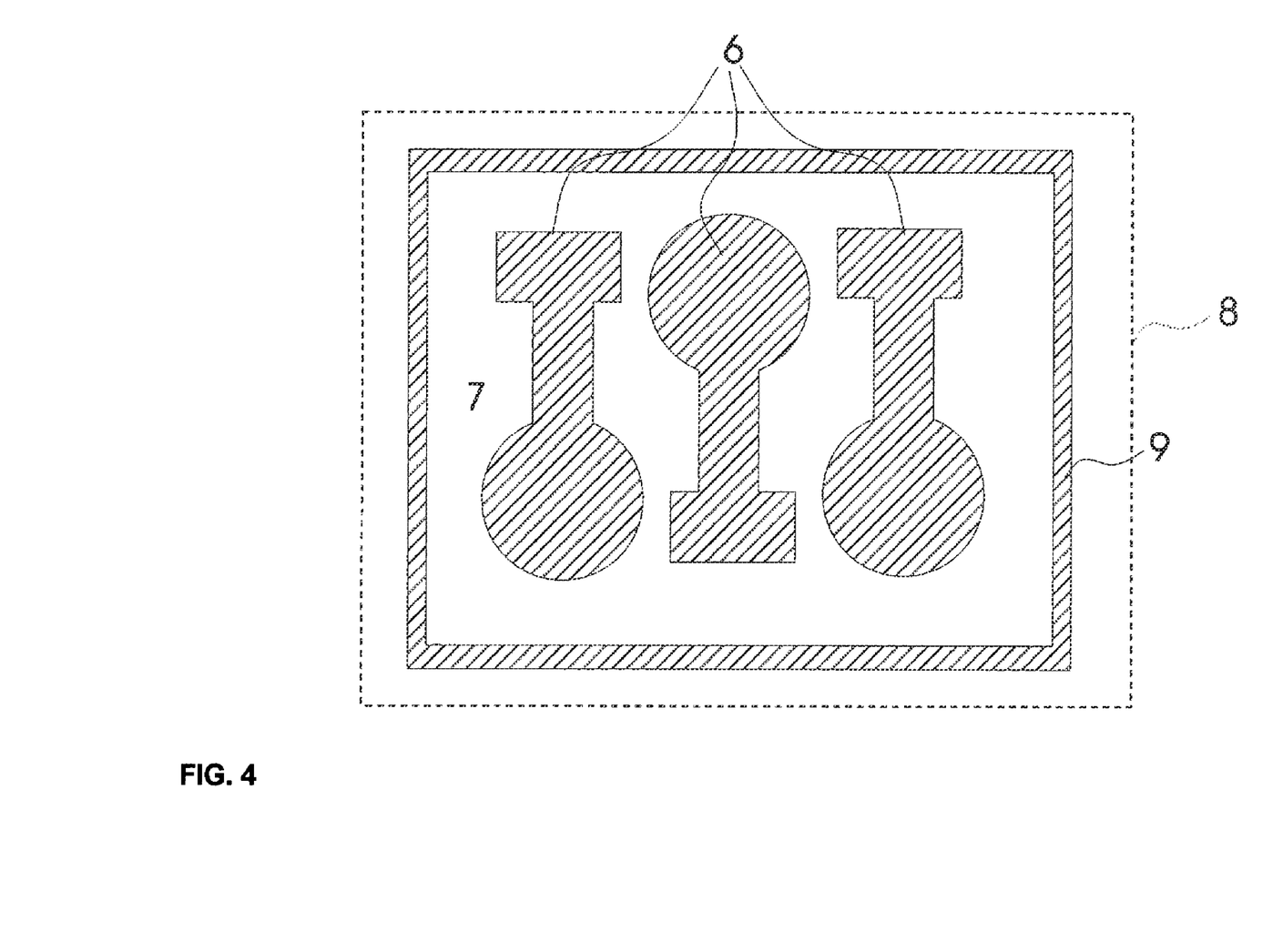
FIG. 4 is a top view of an illustrative example of three moulds formed according to the invention which have no cubic outside contours.

FIG. 4 illustrates the formation of moulds 6, which have no cubic outside contours. This can for example be about cores. These are placed inside an enclosure box 9, which are built together with it. At the end of the process the box is removed and the loose particle material 7 vacuumed.

Figure 5:
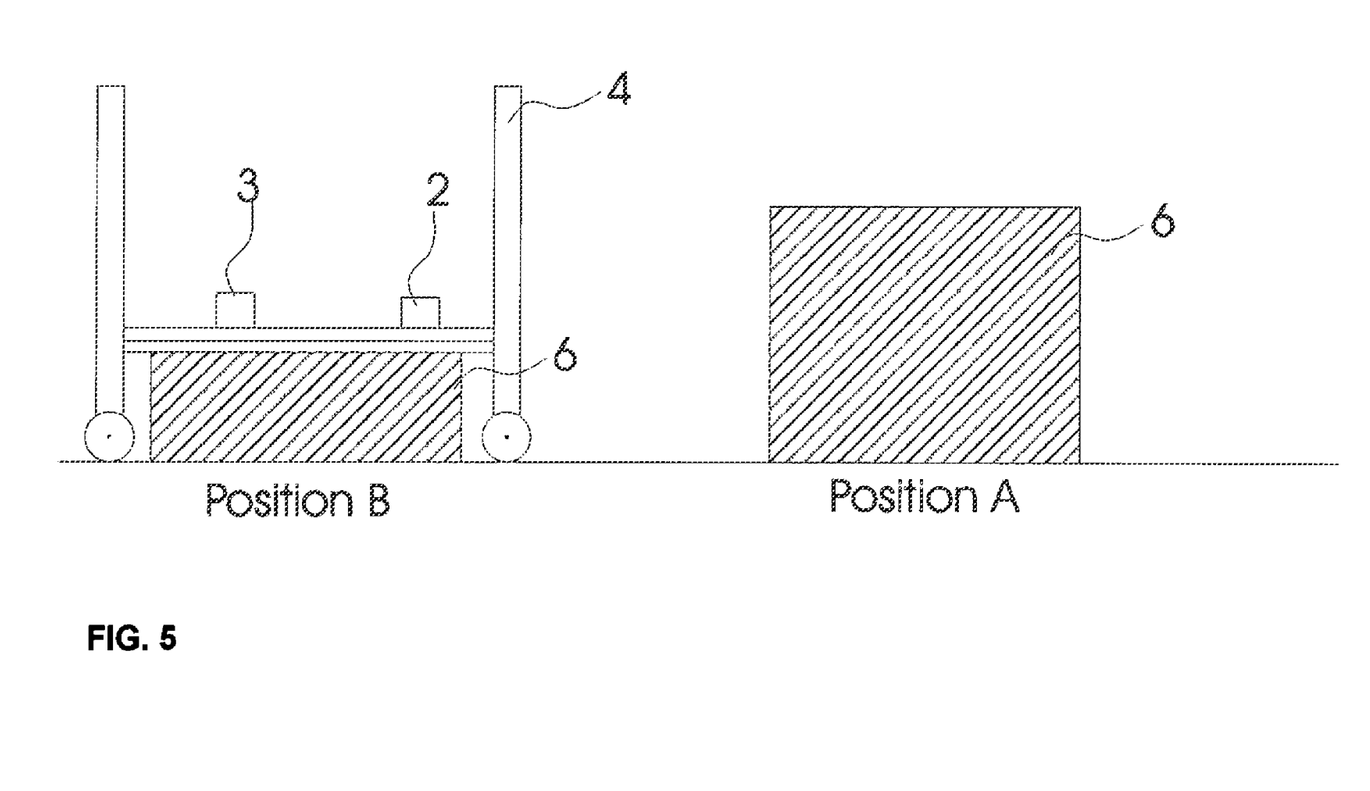
FIG. 5 is a side view of an illustrative example of a design of a device according to the invention.

FIG. 5 illustrates a design of the plant according to the invention, which can be moved on rollers from a position A to a position B. A complete mould 6 is already in position A, which is now being cleaned from excess particle material. A new mould 6 is being formed in position B.

Figure 6:
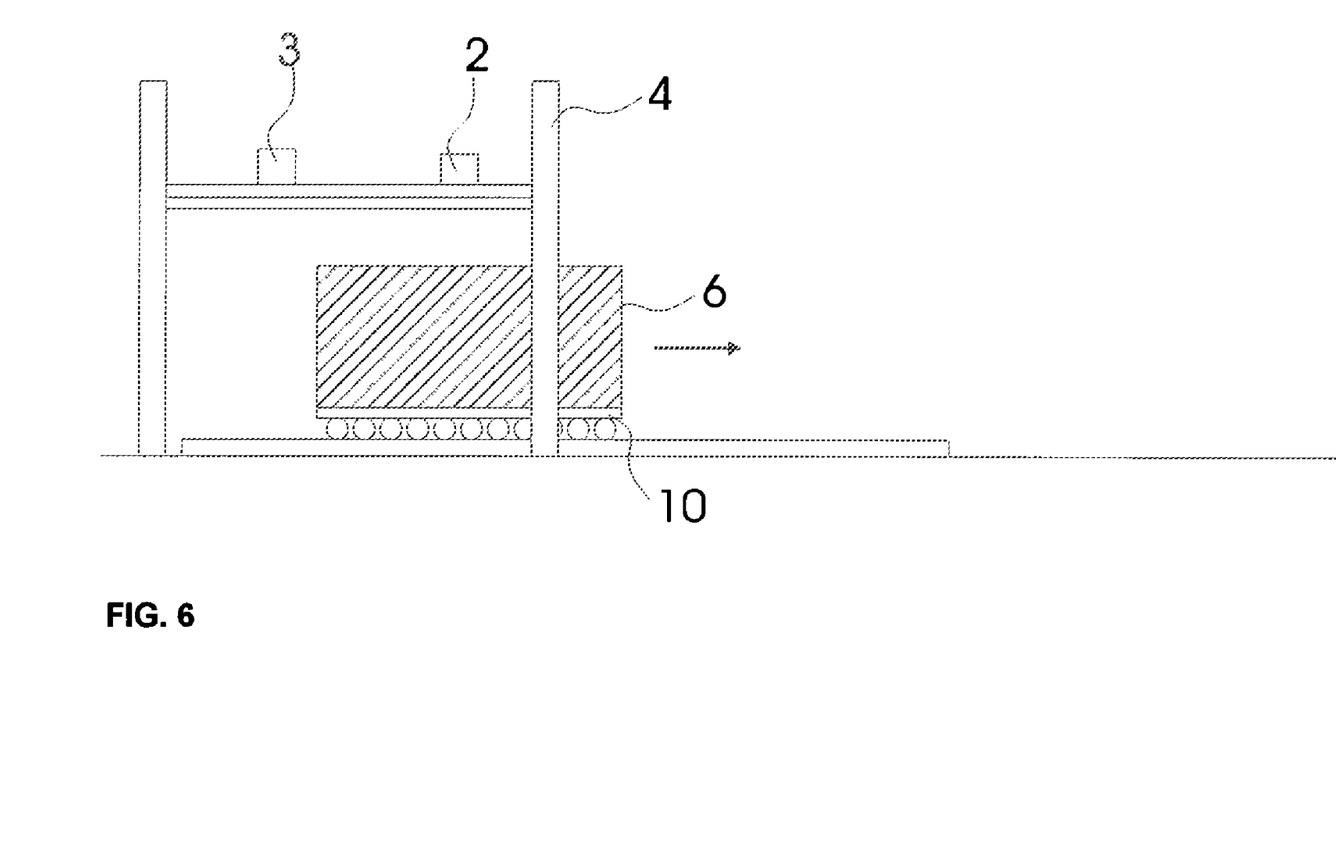
FIG. 6 is a side view of a second illustrative example of a design of a device according to the invention.

FIG. 6 illustrates a design of the plant according to the invention, in which a building platform 10 is supported on rollers on which the mould 6 can be moved out of the plant in an unpacked position at the end of the process.

The skilled artisan will recognize that the above teachings may be modified in any of a number of ways yet still stay within the scope of the present invention. The present invention contemplates techniques and methods for the construction of a laminated compound made up of a number of layers of particle material on top of each other, which are hardened and joined to each other in predetermined onsite areas to manufacture a mould. The skilled artisan will recognize, however, that from application to application, design requirements will vary, and therefore a reasonable amount of experimentation may be needed to adapt the various teachings to the unique intended environment.

The invention claimed is:

1. A method for the construction of a multi-layered laminated compound formed of particulate matter comprising the steps of:
   a. placing a layering unit over a working field;
   b. utilizing data to control movement and operation of the layering unit;
   c. lifting the layering unit;
   d. moving the layering unit;
   e. depositing a layer consisting of solid particulate matter from an elongated dispensing opening in a dispensing device in the layering unit with a predetermined layer thickness and a predetermined pattern on the working field;
   f. delivering a hardener selectively to the solid particulate matter to join it to any previously deposited particulate matter; and
   g. repeating steps (b-f) until the multi-layered laminated compound is complete;
   whereby the multi-layered laminated compound on the working field is formed freestanding and without the use of an outer edge enclosure device for a respective top layer to be deposited, that the dispensing device is moved on a frame which can gradually be adjusted vertically upwards by its layer thickness before the depositing of each respective top layer, and whereby the deposited top layer is hardened along an edge area of at least the front edge in the direction of movement of the dispensing device by the administering of a laser beam or by the application of a binding agent, so that a hardened boxing of the laminated compound is formed from the particulate matter, at least along its front end in the direction of movement of the dispensing device.

2. The method according to claim 1, whereby the dispensing device is set into motion from a position where its dispensing opening is at a distance in front of a front edge of the previous layer in the direction of movement of the dispensing device, and is switched on when its dispensing opening reaches the area above the front edge of the previous layer.

3. The method according to claim 2, whereby the dispensing device is moved over a back edge of the previous layer in the direction of the movement, and switched off when its dispensing opening reaches the area above the back edge of the previous layer.

4. The method according to claim 1, whereby the top layer is smoothed and/or compressed behind the dispensing opening during the movement of the dispensing device in the direction of movement.

5. The method according to claim 4, whereby the compression is performed in a compression movement by movement components corresponding to the direction of movement of the dispensing device.

6. The method according to claim 1, whereby the dispensing device used, further comprises a funnel-shaped dispensing duct for the particulate matter to be deposited, which ends at its bottom end in the dispensing opening, which can be switched on by the fact that the particle material vibrates in the dispensing duct and thereby becomes fluid.

7. The method according claim 1, whereby the layers are deposited in the layer thickness of about 100 to 500 μm at a granular size of the particulate matter of about 20 to 300 μm.

8. The method according to claim 7, whereby the layers are deposited in the layer thickness of about 100 to 500 μm at the granular size of the particulate matter of about 50 to 200 μm.

9. The method according to claim 1, whereby the edge area of the top layer is hardened, at least along its front edge compared to the hardened edge area of the previous layer, offset to the vertical centre of the laminated compound, so that the boxing wall runs at an angle to the vertical.

10. The method according to claim 2, whereby the dispensing device is switched on when the dispensing opening is above the area close to the back of the front edge of the previous layer in the direction of movement of the dispensing device.

11. The method according to claim 3, whereby the dispensing device is switched off when the dispensing opening is above the area close to the front of the back edge of the previous layer in the direction of movement of the dispensing device.

12. The method according to claim 1, whereby the lifting operation for the lifting of the dispensing device and the moving operation of the dispensing device can be controlled independent of one another.

13. A method for the construction of a multi-layered laminated compound formed of particulate matter comprising the steps of:
  a. placing a layering unit over a working field;
  b. utilizing data to control movement and operation of the layering unit;
  c. lifting the layering unit;
  d. moving the layering unit;
  e. depositing a layer consisting of solid particulate matter from an elongated dispensing opening in a dispensing device in the layering unit with a predetermined layer thickness and a predetermined pattern on the working field;
  f. delivering a hardening means selectively to the solid particular matter to join it to any previously deposited particulate matter; and
  g. repeating steps (b-f) until the multi-layered laminated compound is complete;
whereby the multi-layered laminated compound on the working field is formed freestanding and without the use of an outer edge enclosure device for a respective top layer to be deposited, that the dispensing device is moved on a frame supported by pillars of a base frame, the dispensing device can be gradually adjusted in a vertical direction and has an access opening over the working field for the measured dispensing of the particle material onto the working field, the access opening can be moved horizontally on the dispensing device, wherein the access opening has an elongated dispensing opening which is open at the bottom, which extends horizontally straight and vertical to the direction of movement of the dispensing device, and which can be systematically switched on and off for the systematic dispensing of the particulate matter, and whereby the deposited top layer is hardened along an edge area of at least the front edge in the direction of movement of the dispensing device by the administering of a laser beam or by the application of a binding agent, so that a hardened boxing of the laminated compound is formed from the particulate matter, at least along its front end in the direction of movement of the dispensing device.

14. The method according to claim 13, whereby the base frame is designed to be mobile and for this purpose can be moved on rollers or wheels.

15. The method according claim 13, whereby the layers are deposited in the layer thickness of about 100 to 500 μm at a granular size of the particulate matter of about 20 to 300 μm.

16. The method according to claim 13, whereby the lifting operation for the lifting of the dispensing device and the moving operation of the dispensing device can be controlled independent of one another.

17. The method according to claim 13, whereby the layers are deposited in the layer thickness of about 100 to 500 μm at a granular size of the particulate matter of about 50 to 200 μm.

18. The method according to claim 13, whereby the top layer is smoothed and/or compressed behind the dispensing opening during the movement of the dispensing device in the direction of movement.

19. A method for the construction of a multi-layered laminated mould formed of particulate matter comprising the steps of:
  a. placing a layering unit over a working field;
  b. utilizing data to control movement and operation of the layering unit;
  c. lifting the layering unit;
  d. moving the layering unit;
  e. depositing a layer consisting of solid particulate matter from an elongated dispensing opening in a dispensing device in the layering unit with a predetermined layer thickness of 100 to 500 μm and a predetermined pattern on the working field, whereby the dispensing device which has a funnel-shaped dispensing duct for the solid particular matter to be deposited, is set into motion from a position where its dispensing opening is at a distance in front of a front edge of the previous layer in the direction of movement of the dispensing device, and is switched on when its dispensing opening reaches the area above the front edge of the previous layer and whereby the dispensing device is moved over a back edge of the previous layer in the direction of the movement, and switched off when its dispensing opening reaches the area above the back edge of the previous layer;
  f. smoothing and/or compressing the top layer behind the dispensing opening during the movement of the dispensing device in the direction of movement;
  g. delivering a hardener selectively to the particulate matter to join it to any previously deposited particulate matter; and
  h. repeating steps (b-g) until the multi-layered laminated mould is complete;
whereby the multi-layered laminated mould on the working field is formed freestanding and without the use of an outer edge enclosure device for a respective top layers to be deposited, that the dispensing device is moved on a frame which can gradually be adjusted vertically upwards by its layer thickness before the depositing of each respective top layer, and whereby the deposited top layer is hardened along an edge area of at least the front edge in the direction of movement of the dispensing device by the administering of a laser beam or by the application of a binding agent, so that a hardened boxing of the laminated compound is formed from the particulate matter, at least along its front end in the direction of movement of the dispensing device.

* * * * *